United States Patent [19]

Gauler et al.

[11] 4,414,748
[45] Nov. 15, 1983

[54] BALL MOUNTING FIXTURE FOR A ROUNDNESS GAGE

[76] Inventors: Allen L. Gauler; Donald F. Pasieka, both of Los Alamos, N. Mex.

[73] Assignee: The United States of America as represented by the U.S. Department of Energy, Washington, D.C.

[21] Appl. No.: 349,224

[22] Filed: Feb. 16, 1982

[51] Int. Cl.³ ............................ G01B 7/28; G01B 7/34
[52] U.S. Cl. .................................. 33/174 Q; 33/1 M; 33/174 TA; 269/21
[58] Field of Search ....... 33/174 Q, 174 TA, 174 TD, 33/174 P, 178 R, 178 E, 201, 1 M; 269/21, 24, 71, 28, 30, 31, 37, 152

[56] References Cited

U.S. PATENT DOCUMENTS

| | | | |
|---|---|---|---|
| 3,099,883 | 8/1963 | Bergemann et al. | 33/201 |
| 3,165,834 | 1/1965 | Benton | 33/174 TA |
| 3,167,326 | 1/1965 | Heessels | 269/21 |
| 3,524,261 | 8/1970 | Klink | 33/174 TA |
| 3,829,978 | 8/1974 | Basin et al. | 269/71 |

OTHER PUBLICATIONS

J. A. Lipa et al., "High Precision Measurement of Gyro Rotor Sphericity", Precision Engineering, vol. 2, No. 3, p. 123, Jul. 1980.

T. S. R. Murthy et al., "Evaluation of Spherical Surfaces", Proceedings of the International Conference, Lercester, G. B. 1979.

*Primary Examiner*—Willis Little
*Attorney, Agent, or Firm*—Paul D. Gaetjens; William A. Eklund; Richard G. Besha

[57] ABSTRACT

A ball mounting fixture for a roundness gage is disclosed. The fixture includes a pair of chuck assemblies oriented substantially transversely with respect to one another and mounted on a common base. Each chuck assembly preferably includes a rotary stage and a wobble plate affixed thereto. A ball chuck affixed to each wobble plate is operable to selectively support a ball to be measured for roundness, with the wobble plate permitting the ball chuck to be tilted to center the ball on the axis of rotation of the rotary stage. In a preferred embodiment, each chuck assembly includes a vacuum chuck operable to selectively support the ball to be measured for roundness. The mounting fixture enables a series of roundness measurements to be taken with a conventional rotating gagehead roundness instrument, which measurements can be utilized to determine the sphericity of the ball.

10 Claims, 6 Drawing Figures

BALL MOUNTING FIXTURE FOR A ROUNDNESS GAGE

BACKGROUND OF THE INVENTION

This invention is a result of a contract with the Department of Energy (Contract No. W-7405-ENG-36).

The invention disclosed herein is generally related to metrological gaging instruments and, more particularly, to roundness gages used for measuring the roundness and sphericity of spherical articles such as ball bearings.

In the following discussion, the terms roundness and sphericity are to be distinguished. The term roundness has reference in two dimensions only, and refers to the deviation of a generally circular curve from a true circle. The term sphericity refers to the three-dimensional shape of a ball, and, more specifically, refers to the deviation of that shape from a perfect geometric sphere. With respect to a ball, the term roundness refers to the shape of the curve defined by the intersection of the surface of the ball with a plane passing through the center of the ball. Thus, many roundness measurements may be taken on a ball; and in referring to the roundness of a ball one must specify the plane with respect to which the reference is made. As will be discussed further below, a determination of the sphericity of a ball usually involves the taking of a series of roundness measurements.

In describing the shape of a ball, it is useful to consider irregularities in the surface of the ball as consisting of components of varying wavelength and amplitude. Short wavelength irregularities in the surface of the ball correspond to textural roughness in the surface finish, and are measured by surface finish assessment techniques such as optical interferometry. Surface irregularities having wavelengths which are longer, yet which are significantly shorter than the circumference of the ball, give rise to what is called "waviness," which may be generally visualized as localized bulges or depressions in the surface of an otherwise spherical ball. Surface irregularities having wavelengths which are longer yet, and which are approximately equal in length to the circumference of the ball, give rise to large scale variations in the shape of the ball and result in an "out-of-round" condition. It is the latter type of irregularity that primarily affects the large scale dimensionality, or sphericity, of a ball. Whereas the presence of waviness in a ball may often be detected relatively simply by one or more randomly oriented roundness measurements, the larger scale variations in sphericity are more difficult to detect and measure with commercially available gaging tools, primarily because of problems associated with centering the ball during successive roundness measurements, as further discussed below.

The roundness of a ball is ordinarily measured with a roundness gage that operates essentially to determine the shape of the path tavelled by a stylus which is used to circumscribe the ball about a great circle. Such a determination is usually made by comparing the shape of the ball with the rotary motion of a precision spindle. There are two basic types of roundness gages having such spindles. In those known as the stationary gagehead type, the ball is centered on a precision spindle and both the spindle and ball are rotated while a relatively stationary gagehead stylus is held in contact with the surface of the ball. If the ball is not perfectly round, the stylus undergoes a slight radial displacement as the ball rotates. This displacement is detected and measured to determine the roundness of the ball. In the second type of roundness gage, known as the rotating gagehead type, the ball is held stationary while a gagehead stylus is held against the ball and orbited around it. The stylus extends from one side of a precision spindle which is centered on the ball and which is rotated to orbit the stylus around the ball. An out-of-round condition in the ball is reflected as a slight radial movement of the stylus relative to the spindle. Such movement is detected and measured to determine the roundness of the ball. The present invention is directed primarily to the latter type of roundness gage, although the invention is by no means limited to such application and may be of use in various other applications which may be apparent to one of ordinary skill in the art.

The determination of the sphericity of a ball requires a number of two-dimensional roundness measurements to be taken in different planes. One common practice has been to take a series of randomly oriented roundness measurements, rotating the ball through an arbitrary angle between each measurement. Although such a method is useful for obtaining a general ideal of whether the sphericity of a ball is within tolerance limits, it is inadequate to obtain detailed information with which the surface of the ball may be mapped in three dimensions.

In order to accurately map the surface of a ball, it is necessary to take a series of roundness measurements at known orientations with respect to one another. Since the orientation of the plane of measurement of the roundness gage is fixed, the ball must be rotated between successive measurements. Various rotational sequences may be employed to obtain a set of roundness measurements with which the ball may be mapped, as discussed further below. Accordingly, it is generally desirable to be able to rotate the ball through any desired angle, and further, to rotate the ball through such angle about any axis of rotation that might be drawn through the center of the ball. Moreover, such rotation must be accomplished without moving the center of the ball from a substantially fixed position that is centered on the axis of the precision gagehead spindle. There has not been previously available an apparatus for performing this function.

Accordingly, it is the broad object and purpose of the present invention to provide a ball mounting fixture with which a ball may be accurately and precisely rotated through selected angles in any angular orientation.

It is also the object and purpose of the present invention to provide a ball mounting fixture for a roundness gage. More particularly, it is an object of the invention to provide a ball mounting fixture for a rotating gagehead roundness gage.

It is also an object to provide a ball mounting fixture for a roundness gage that enables accurate determination of the sphericity of a ball and the three-dimensional mapping of its surface.

It is another object of the present invention to provide a mounting fixture that enables a ball to be accurately centered on the axis of rotation of a precision spindle of a rotating gagehead roundness gage, and which also enables the ball to be precisely rotated through selected angular increments about any desired axis of rotation.

It is yet another object to attain the foregoing objects and purposes in a mounting fixture capable of supporting balls of various diameters.

It is also an object to provide a mounting fixture that achieves the foregoing objects and which also avoids surface damage to balls made of soft or delicate materials.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the ball mounting fixture of the present invention comprises two transversely oriented ball chuck assemblies mounted on a common base. Each ball chuck assembly includes a rotatable stage and a ball chuck attached thereto. Each of the ball chucks may be selectively actuated to securely retain a ball thereon. Further, each ball chuck is attached to its respective rotatable stage by positioning means which enables the position of the chuck to be adjusted radially with respect to the axis of rotation of the stage, such that a ball may be secured to the chuck and subsequently centered on the axis of rotation of the rotatable stage. As a result, each ball chuck assembly is independently operable to support the ball and rotate it about an axis passing through its center while so supported.

Additionally, the ball may be transferred smoothly from one chuck assembly to the other by actuating one ball chuck and deactuating the other chuck, with the ball being held in a fixed orientation throughout such a transfer. Consequently, the two chuck assemblies may be operated in sequence, by rotating them about their mutually transverse axes, in order to rotate the ball through any desired angular increment and about any axis passing through the center of the ball, and with the center of the ball always being returned to substantially the same location after each such rotation. As a result, a precise determination of the sphericity of the ball may be made by taking a series of roundness measurements at precisely known orientations to one another.

The ball chuck of each chuck assembly preferably consists of a vacuum chuck which may be selectively actuated to secure a ball in a fixed position thereon. The positioning means attaching the vacuum chuck to the rotatable stage preferably includes an adjustable wobble plate assembly. With such an assembly the vacuum chuck may be pivotably mounted on the rotatable stage, and centering of a ball seated on the vacuum chuck may be effected by tilting the wobble plate about its pivot point, which lies on the axis of rotation of the rotary table.

In accordance with other aspects of the invention, one chuck assembly is movable in translation relative to the other. The movable chuck assembly is preferably mounted on a three-way slide table assembly which enables the chuck assembly to be translated rectilinearly in three dimensions. This enables the movable chuck assembly to be moved away from the nonmovable chuck assembly to permit roundness measurements to be taken while a ball is mounted on the nonmovable chuck assembly. Additionally, the position of the movable chuck assembly may be adjusted so that its axis of rotation is accurately centered on both the axis of the nonmovable chuck assembly and the center of a ball to be measured for roundness. As a result, balls of various sizes can be accommodated by the mounting fixture. Moreover, a ball can be accurately rotated in any angular orientation by successive rotations of the two chuck assemblies, but with the ball not undergoing any substantial rotation as it is transferred from one chuck assembly to the other.

The ball mounting fixture enables the surface of a ball to be precisely mapped for the purpose of determining the sphericity of the ball. In this regard, an important advantage of the mounting fixture over the prior art is that the ball can be precisely rotated through any desired angle in any angular orientation between the taking of successive roundness measurements. Moreover, an imperfect or irregularly shaped ball can be so rotated and yet also be centered on the axis of rotation of the gagehead spindle after each rotation. These and other advantages and the means by which they are achieved will be more readily apparent upon consideration of the following description of the preferred embodiment, taken with the accompanying drawings.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
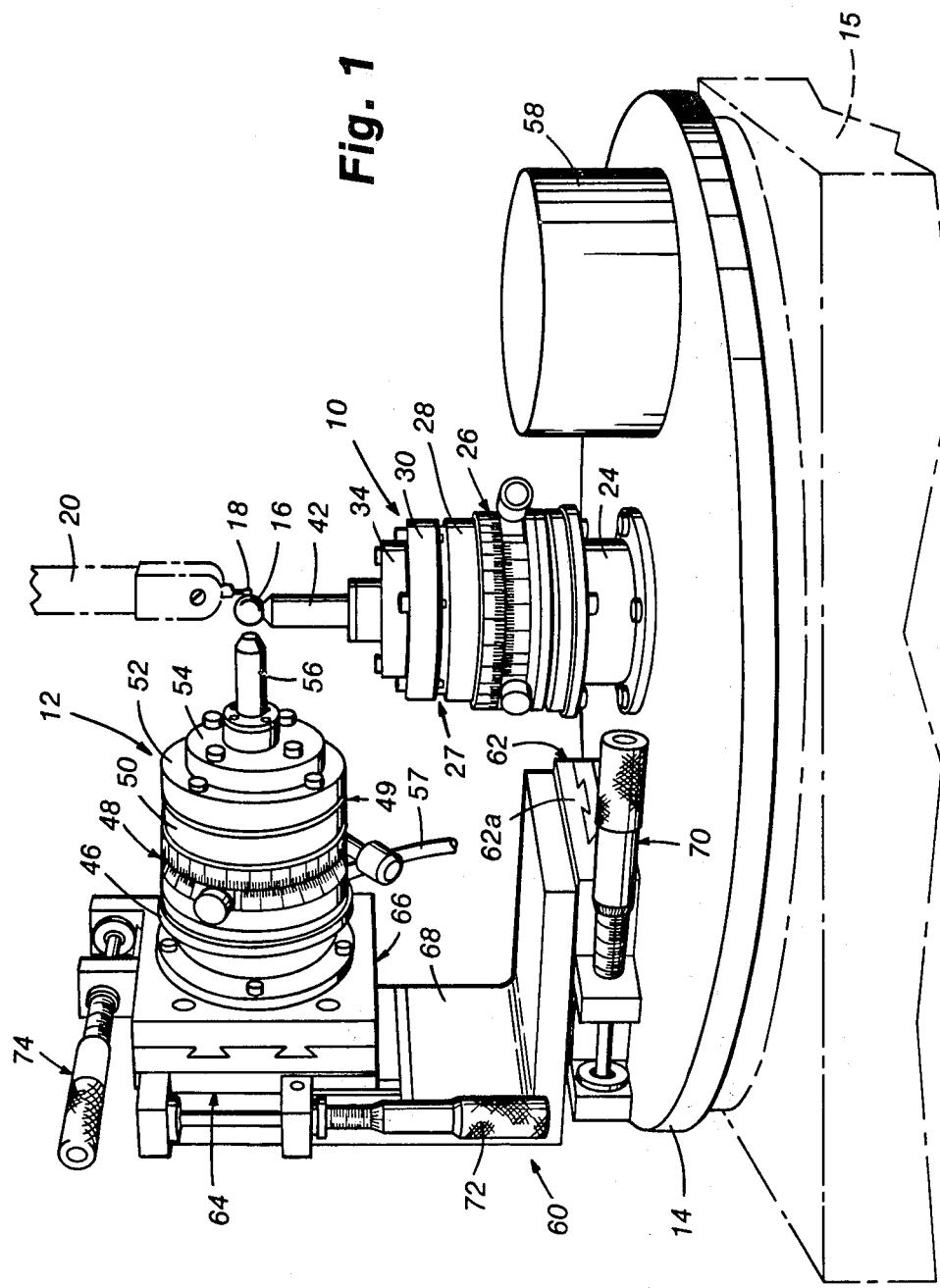
FIG. 1 is an isometric view of the preferred embodiment of the ball mounting fixture of the present invention, with elements of a conventional rotating gagehead roundness gage shown in phantom outline.
Figure 2:
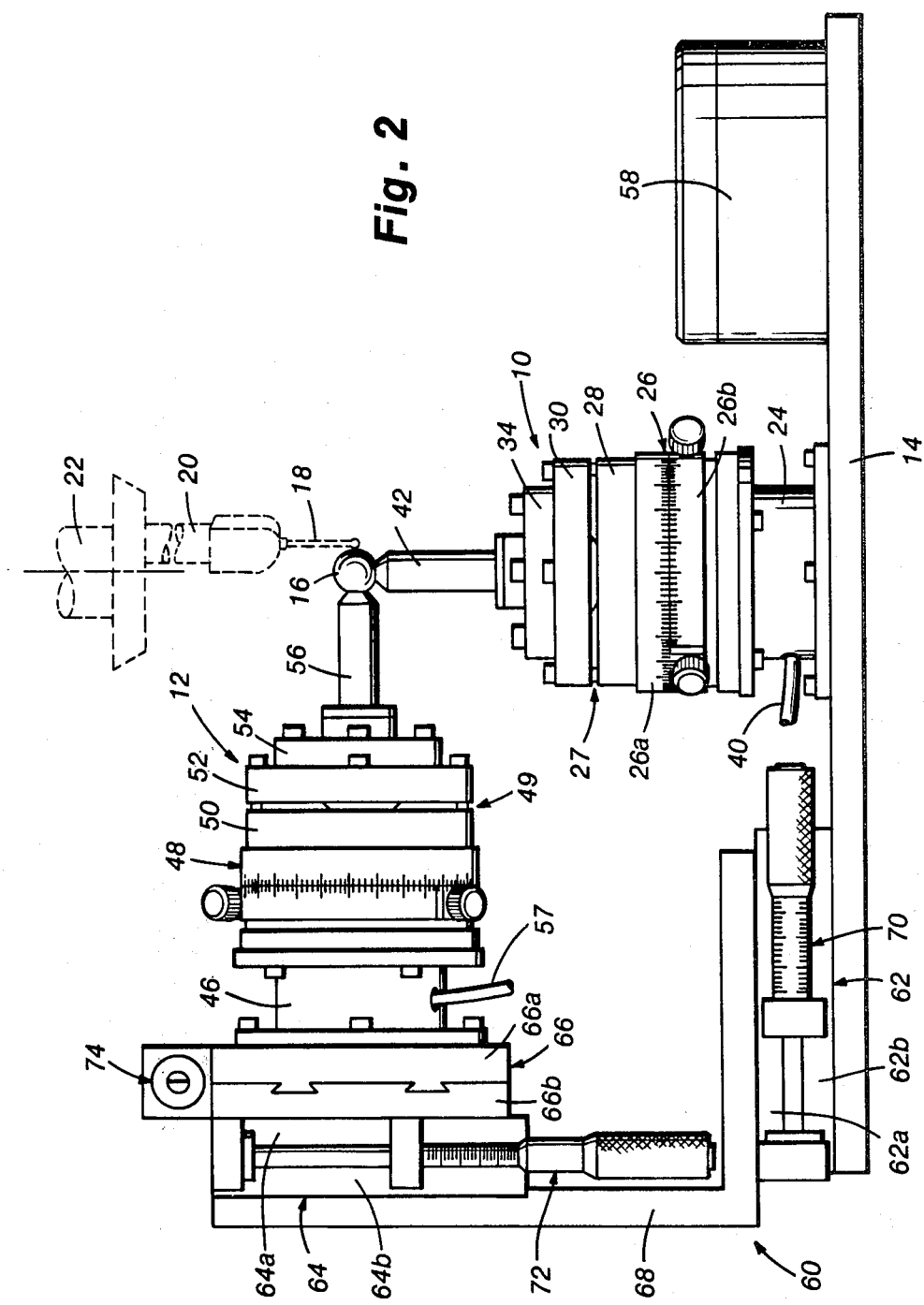
FIG. 2 is a side elevation view of the mounting fixture shown in FIG. 1.
Figure 3:
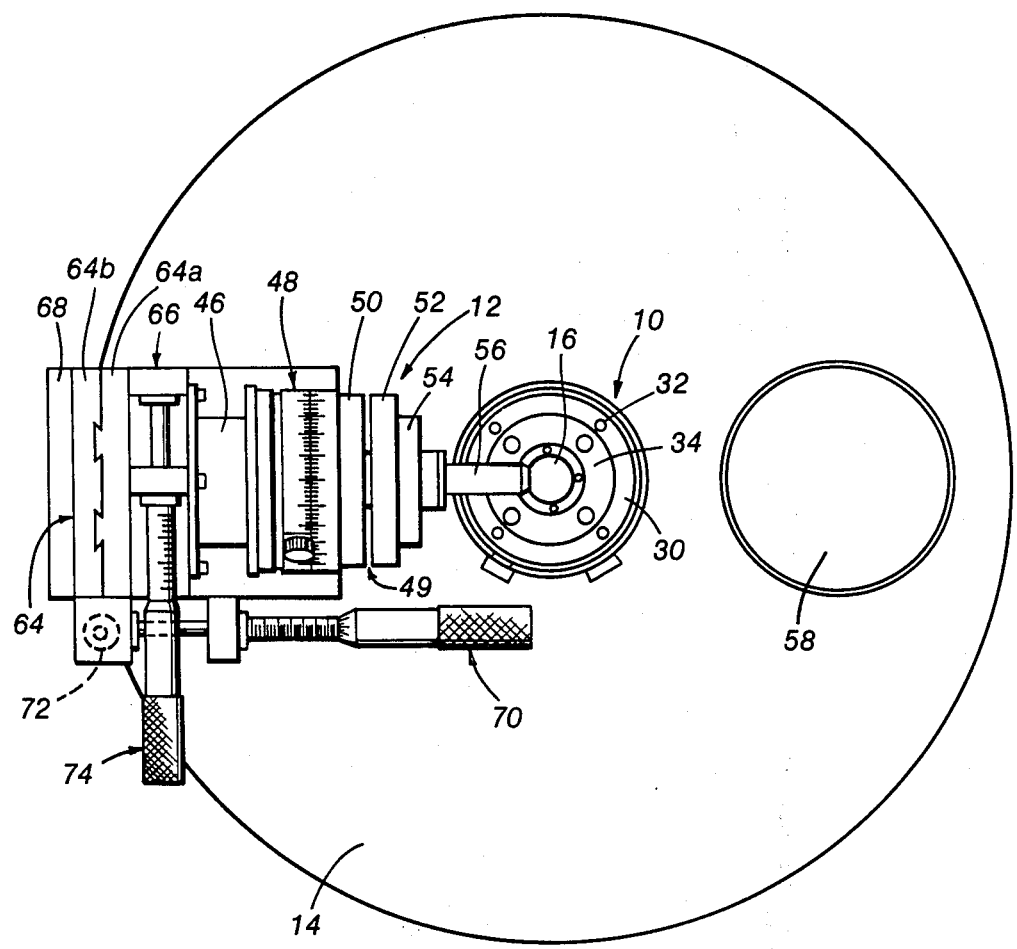
FIG. 3 is a plan view of the mounting fixture shown in FIG. 1.

Referring first to FIGS. 1 through 3, the preferred embodiment of the ball mounting fixture generally includes a vertical chuck assembly 10 and a horizontal chuck assembly 12, both of which are mounted on a circular base plate 14. The entire mounting fixture is mountable on a horizontal slide table 15 of a conventional rotating gagehead roundness gage. As discussed further below, the function of the vertical chuck assembly 10 is to support a ball 16 in a stationary position while roundness measurements are taken, and also to rotate the ball about a vertical axis between such measurements. The horizontal chuck assembly 12 is used to support and position the ball between roundness measurements, but is removed from the ball while roundness measurements are being taken.

Roundness measurements are taken by circumscribing the stationary ball 16 with a precison stylus 18. The stylus 18 is pivotably attached to an arm 20 that extends downwardly from an overhead precision spindle 22 (shown in FIG. 2). The precision spindle 22 rotates about a vertical axis of rotation which is centered on the ball 16 and which is also coaxial with the axis of rotation of the vertical chuck assembly 10. The stylus 18 is offset radially from the axis of the precision spindle 22 by a distance approximately equal to the radius of the ball 16, such that the stylus 18 travels in a horizontal orbit around the ball 16 at its widest point; i.e., along a great circle orbit having a diameter substantially equal to the diameter of the ball 16. A bias spring (not shown) maintains the stylus 18 urged radially inwardly against the surface of the ball 16. The stylus 18 is coupled to a transducer (not shown) that is responsive to inward and outward horizontal radial displacement of the tip of the stylus 18 as it circumscribes the ball 16. It will be apparent that no displacement will occur with a ball that is perfectly round in the horizontal plane being measured, and which is exactly centered on the axis of the overhead spindle 22. Short wavelength displacements of the stylus arise from roughness of the surface finish of the ball, whereas long wavelength displacements arise due to waviness or an out-of-round condition in the ball.

Figure 6:
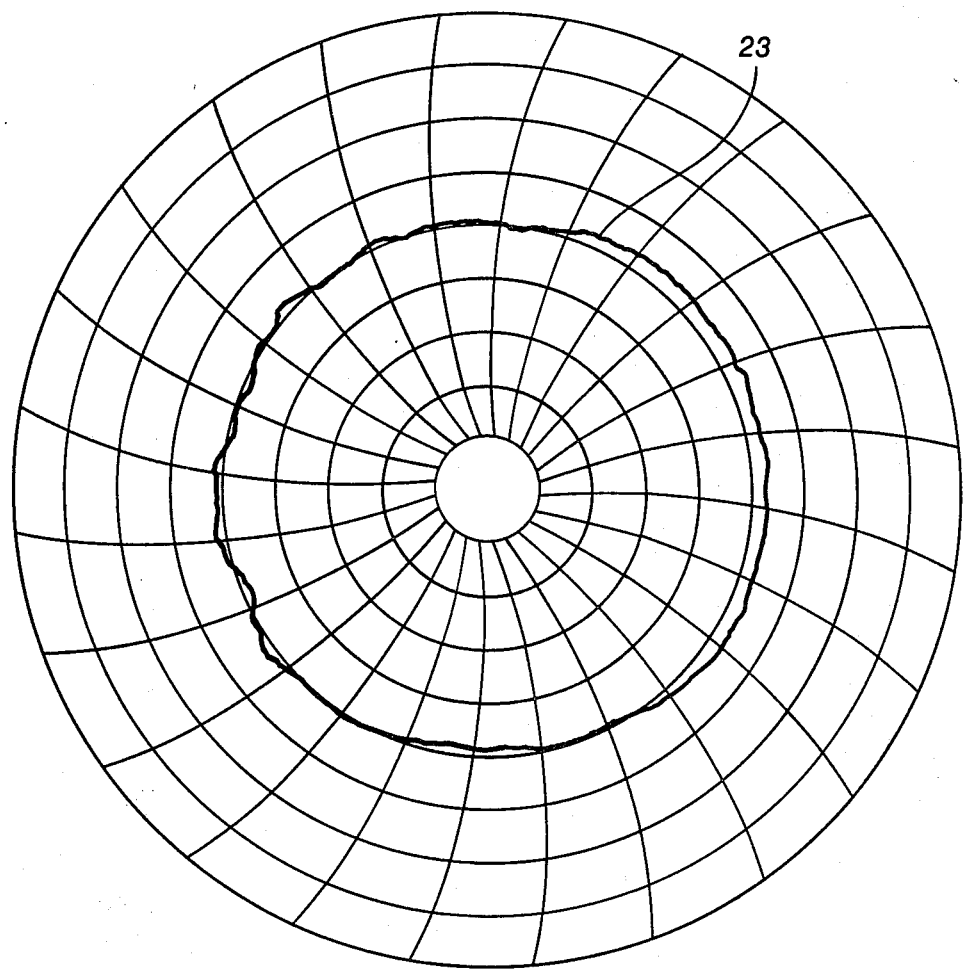
FIG. 6 is a graphical illustration of the results of a typical roundness measurement, as recorded on a polar chart.

The transducer coupled to the stylus 18 produces an electrical signal that is representative of the radial displacement of the stylus 18. This signal is ordinarily recorded as a function of the angular position of the stylus about the ball 16, which may be measured, for example, by means of a shaft angle encoder coupled to the spindle 22. The electrical signals representing the radial displacement and angular orientation of the stylus are recorded, either in analog or digital form, so as to provide a record of the shape of the circumferential path traveled by the tip of the stylus 18 during each measurement cycle. FIG. 6 illustrates an exemplary trace 23 such as is obtained during a typical roundness measurement. The trace 23 is shown as it is recorded in graphical form on a polar chart.

Figure 4:
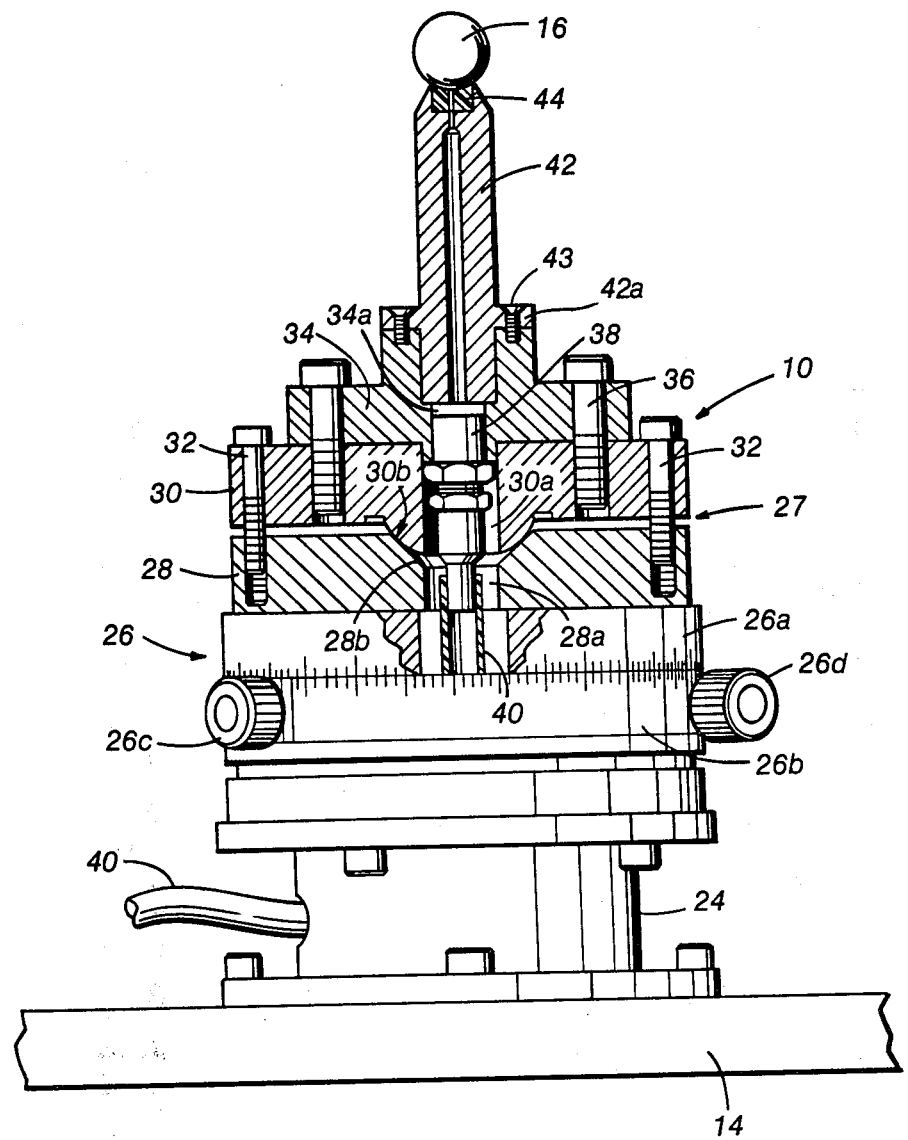
FIG. 4 is a side view in cross section of the vertical chuck assembly of the mounting fixture shown in FIG. 1.

The vertical and horizontal chuck assemblies 10 and 12 are substantially identical and will be described in further detail primarily by reference to the vertical chuck assembly 10. Referring particularly to FIG. 4, the vertical chuck assembly 10 includes a hollow pedestal 24 which is affixed to the center of the base plate 14. Mounted on the pedestal 24 is a rotary table 26 which consists of a rotatable stage 26a and a fixed stage 26b, each of which is marked with angular index lines to permit accurate indexing of the rotatable stage with respect to the fixed stage. The fixed stage 26b is nonrotatable with respect to the pedestal 24 and the base plate 14, whereas the rotatable stage 26a is rotatable about a vertical axis. A pair of counterscrews 26c and 26d permit the rotatable stage 26a to be locked in position, and also may be used to drive the rotatable stage 26a in fine adjustment.

A precision wobble plate assembly 27 is mounted on the rotatable stage 26a. The wobble plate assembly 27 consists of a fixed bearing plate 28 and a pivotable ball-seat wobble plate 30. The bearing plate 28 is affixed to the upper side of the rotatable stage 26a, and includes a central bore 28a which opens at its upper end onto an upwardly facing conical seat 28b. The wobble plate 30 includes a central bore 30a, and further includes an integral, downwardly protruding semispherical pivot element 30b. The semispherical pivot element 30b rests on the conical seat 28b of the bearing plate 28 so as to space the wobble plate 30 from the bearing plate 28 and to also permit the wobble plate 30 to undergo limited pivotal motion with respect to the bearing plate 28. The wobble plate 30 and the bearing plate 28 are each centered on the rotatable stage 26a, such that pivotal motion of the wobble plate 30 is about a pivot point which lies on the axis of rotation of the rotatable stage 26a.

Pivotal motion of the wobble plate 30 is controlled by means of four adjustment screws 32 which connect the wobble plate 30 to the bearing plate 28. The adjustment screws 32 are equally spaced about the periphery of the wobble plate 30 and may be selectively tightened or loosened to effect tilting of the wobble plate 30, as described further below.

A chuck mounting member 34 is affixed to the upper side of the wobble plate 30 by means of four screws 36. The mounting member 34 includes a central bore 34a in which is fitted a vacuum fitting 38. The vacuum fitting protrudes downwardly from the mounting member 34 into the bore 30a of the wobble plate 30, and is connected through a rotatable vacuum seal (not shown) to a length of flexible vacuum tubing 40. The tubing 40 passes through the central bores of the bearing plate 28 and the rotary table 26, and through an aperture in the wall of the hollow pedestal 24. The tubing 40 is connected to a vacuum source and suitable valving by which a vacuum may be applied to the bore of the chuck mounting member 34.

The chuck mounting member 34 supports a brass vacuum chuck 42 which is set into the bore 34a and extends upwardly therefrom. The vacuum chuck 42 includes an integral collar 42a by which the chuck 42 is affixed to the mounting member 34 with four screws 43. The upper end of the brass chuck 42 is tapered to allow the chucks of the two chuck assemblies 10 and 12 to be brought relatively close together while at right angles to one another. The upper end of the chuck 42 also includes an upwardly opening cylindrical recess in which is inserted a polymeric ball seat 44, which is preferably formed of polystyrene. Both the chuck 42 and the ball seat 44 have central bores by which a vacuum may be applied to seat the ball 16 firmly on the ball seat 44. The ball seat 44 is provided with an upwardly facing conical seating surface on which the ball 16 rests. Although the ball seat 44 is preferably formed of polystyrene, other suitable materials may be used which adequately prevent surface damage to balls formed of relatively soft materials.

The vacuum chuck 42 and the ball seat 44 will ordinarily be of a size and shape particularly adapted to the size of the ball 16 being measured. Thus, a set of interchangeable vacuum chucks may be used where balls of various diameters are to be routinely measured. It is for this reason that the chuck mounting member 34 and the associated vacuum fitting 38 are formed separately from the vacuum chuck and are affixed to the wobble plate 30 to permit the various vacuum chucks to be easily exchanged as required.

Referring to FIG. 2, the horizontal chuck assembly 12 is substantially identical to the vertical chuck assembly 10, including a mounting pedestal 46, a rotary table 48, a wobble plate assembly 49 consisting of a bearing plate 50 and a ball-seat wobble plate 52, a chuck mounting member 54, and a vacuum chuck 56 having a polystyrene ball seat. The chuck 56 is actuated by application of a vacuum to a vacuum line 57. The structure and function of the various elements of the horizontal chuck assembly 12 are substantially as described above with respect to the corresponding elements of the vertical chuck assembly 10. As in the vertical chuck assembly, the wobble plate 52 enables a ball seated on the vacuum chuck 56 to be centered on the axis of rotation of the rotary table 48.

A counterweight 58 is situated on the opposite side of the base plate 14 from the horizontal chuck assembly 12 to position the center of gravity of the fixture near the center of the base 14.

The horizontal chuck assembly 12 is mounted on a three-way slide table assembly 60 that permits rectilinear motion of the horizontal chuck assembly 12 in three dimensions. More specifically, the slide table assembly 60 includes a horizontal slide table 62 mounted on the base plate 14, and a pair of transversely oriented upright slide tables 64 and 66 mounted on an upright angle member 68. Each slide table includes a movable plate (62a, 64a, and 66a) and a fixed plate (62b, 64b and 66b). The slide tables 62, 64 and 66 are conventional in the art and are illustrated in a simplified schematic form for purposes of illustration.

The horizontal chuck assembly 12 is affixed to the movable plate 66a of the slide table 66. The fixed plate 66b of the slide table 66 is affixed to the movable plate 64a of the slide table 64. The fixed plate 64b of the upright slide table 64 is affixed to the upright arm of the right angle member 68, and the horizontal arm of the angle member 68 is affixed to the movable plate 62a of the horizontal slide table 62. The fixed plate 62b of slide table 62 is affixed to the base plate 14.

The movable plates of the three orthogonal slide tables 62, 64, and 66 are driven by respective micrometer adjustment screws 70, 72, and 74. The micrometer screw 70 drives the movable plate 62a of the horizontal slide table 62 radially inwardly and outwardly with respect to the axis of the vertical chuck assembly 10, thereby enabling the horizontal ball chuck 56 to be moved toward and away from the ball 16. The micrometer screw 72 drives the movable plate 64a of the slide table 64 vertically, thereby enabling the horizontal chuck assembly 12 to be raised or lowered so as to be centered on and to accommodate balls of varying diameters. Finally, the third micrometer screw 74 drives the movable plate 66a of the slide table 66 laterally with respect to the axes of both the horizontal and vertical chuck assemblies, thereby enabling the horizontal chuck 56 to be laterally centered on a ball 16 seated on the vertical chuck assembly 10.

Prior to operation, a sequence of alignment adjustments is necessary to correctly align the two ball chuck assemblies, the ball to be measured, and the spindle of the roundness gage. The initial step in alignment is to center of the ball 16, while seated on the vertical vacuum chuck 42, on the axis of rotation of the vertical chuck assembly. This is accomplished using the wobble plate 30 and a stationary indicator, which is ordinarily the stylus 18. In this regard, the wobble plate 30 is tilted as required, by progressive adjustment of the screws 32, until the ball is centered on the axis of rotation of the rotary table 26. Coarse adjustments of the wobble plate 30 are made by loosening one of the adjustment screws 32 and tightening the opposite screw 32, which causes the wobble plate 30 to tilt with respect to the bearing plate 28. Fine adjustments are then made by tightening one screw 32 without loosening the opposite screw, thereby slightly deforming the wobble plate to obtain a small angular deflection of the vacuum chuck 42.

The entire mounting fixture is then moved horizontally on the precision slide table 15 of the roundness gage until the ball 16 is centered on the axis of rotation of the overhead spindle 22. At this point, the axis of the spindle 22 and the axis of the vertical chuck assembly 10 are coaxial and each pass through the center of the ball 16. The slide table 15 of the roundness gage is then raised or lowered, as required, until the stylus output indicates that the stylus 18 is in contact with the ball 16 at its maximum diameter; i.e., that the plane of measurement is a horizontal plane passing through the center of the ball.

The ball 16 is then centered on the axis of the horizontal chuck assembly 12. This is done using a stationary gagehead in the same manner as described above for the vertical chuck assembly 10. Finally, the amount of offset of the center of the ball 16 from the axis of the roundness gage spindle 22, while supported by the horizontal ball chuck 56, is observed by rotating the spindle 22 and the stylus 18 partially around the ball. The ball 16 is centered on the axis of the spindle 22 by moving the chuck assembly 12 in the horizontal plane using the slide tables 66 and 70. The vertical micrometer slide table 64 is then used to lower the ball until it just contacts the vertical chuck 42, whereupon it may be transferred to the vertical chuck 42 by switching the vacuum from the horizontal chuck assembly 12 to the vertical chuck assembly 10.

At this point, the horizontal and vertical chuck assemblies are located such that the vacuum chucks 42 and 56 are each just in contact with the ball 16, and further such that the ball occupies the same position while supported by either one of the chuck assemblies. The readings of the micrometer adjustment screws 70, 72 and 74 are then recorded, the ball is transferred to the vertical chuck assembly, and the horizontal chuck assembly is backed away from the ball. The recorded micrometer readings enable the horizontal chuck assembly to be later moved up to the ball and to be positioned in a centered position just in contact with the ball.

To describe the actual manipulation of the mounting fixture during the taking of roundness measurements, it is first necessary to establish a convention for the description of the ball. For purposes of the following description, therefore, a ball to be measured for roundness will be described in geographical terms as having lines of latitude and longitude. The ball also includes opposite north and south poles where the lines of longitude intersect to define a polar axis of rotation. Additionally, there is an equatorial line of latitude defined by a great circle oriented transversely with respect to the polar axis of rotation. This convention is illustrated schematically in FIG. 5.

As noted earlier, to arrive at a description of the three-dimensional sphericity of a ball by the taking of two-dimensional roundness measurements, it is necessary to make roundness measurements in more than one plane. One particularly useful and efficient approach that requires relatively few measurements is to take a series of roundness measurements about a set of great circles that are analogous to the geographical lines of longitude, as illustrated schematically in FIG. 5. Such great circles define planes that intersect along the common polar axis which passes through the diametrically opposed poles on the surface of the ball. Roundness measurements about such great circles may be made, for example, by rotating the ball by a predetermined angle after each measurement about a horizontal axis of rotation extending diametrically through the orbit of the orbiting stylus. After a number of such roundness measurements have been taken, an equatorial roundness measurement may be taken as illustrated by the equatorial line shown in FIG. 5. In practice, it is found that such a series of roundness measurements is sufficient in many practical applications for determining the sphericity of a manufactured article.

To obtain the sequence of roundness measurements described above, the roundness gage and the mounting fixture of the invention are operated as follows. The stylus of the roundness gage is first brought into contact with the ball, and the spindle to which the stylus is attached is rotated until the stylus is opposite the horizontal chuck assembly 12. This location on the ball is designated the south pole of the ball, and lies at the intersection of the axis of rotation of the horizontal chuck assembly with the surface of the ball opposite the horizontal chuck assembly. The point on the opposite side of the ball is designated the north pole. A roundness measurement is then made by orbiting the stylus around the ball in a horizontal plane, and the angular position of the north pole is marked on the resulting polar chart recording.

The ball is then rotated about the polar axis passing through the above-defined north and south poles. This is accomplished by moving the horizontal chuck assembly 12 toward the ball 18 until the horizontal vacuum chuck 56 is just in contact with the ball. The recorded micrometer screw readings are observed in this movement. Vacuum is then applied to transfer the ball to the horizontal vacuum chuck 56, and the horizontal chuck assembly 12 is raised slightly by means of the vertical micrometer screw 72. The rotary table 48 of the horizontal chuck assembly 12 is then rotated by the desired angle, for example the angle $\theta$ shown in FIG. 5, and the ball is then lowered and transferred once again to the vertical vacuum chuck 42. The horizontal chuck assembly 12 is then backed away from the ball, and another roundness measurement is ready to be taken.

At this point, it is instructive to consider what effect a deviation from perfect sphericity will have upon the position of the ball when it is transferred between the two chuck assemblies. If the ball is imperfect, it will locate in a slightly different position on the conical insert of the vertical chuck assembly than the position it occupied during the first roundness measurement. That is, the polar axis of the ball, while still parallel to its original position, may be displaced vertically and horizontally from that original position. The magnitude of this displacement may be on the order of the deviation from sphericity, or it may be larger if there are inaccuracies in the shape of the conical chuck insert. A small vertical displacement of the polar axis of the ball will cause a negligible error in the next roundness measurement, because such errors vary as the cosine of the angle between a horizontal great circle about the ball and the circle traversed by the stylus, which is in any event a small angle. However, offsets in the horizontal plane will be readily observed, and may be misinterpreted as a bulge in the ball to one side of the polar axis.

Because the polar axis may have been displaced horizontally as just described, no information is lost by once again moving the slide table 15 of the roundness gage so as to center the ball on the axis of the precison spindle 22. Therefore, this adjustment is conducted before each roundness measurement. The angular position of the north pole on the polar chart recording of the next roundness measurement is then known to be the same as its angular position in the first measurement, because the polar axis of the ball is substantially parallel to its original position. However, the data may need to be shifted to one side of this axis by an as yet unknown amount to account for the polar axis being displaced horizontally from its original location.

The above-described sequence of successively rotating, centering, and obtaining a roundness measurement on the ball is repeated until the required number of measurements is obtained. The angular orientations of all of the roundness measurements with respect to one another are known, so that the polar chart recordings correspond directly. However, each recording may have to be shifted in a direction perpendicular to the polar axis, that is, in the plane of the equator of the ball. The amount by which the data must be shifted in this plane can be determined if the shape of the equator of the ball is known, since the points at an angular position of 90° from the north pole on each longitudinal roundness measurement must lie on the equator at a known longitude.

Figure 5:
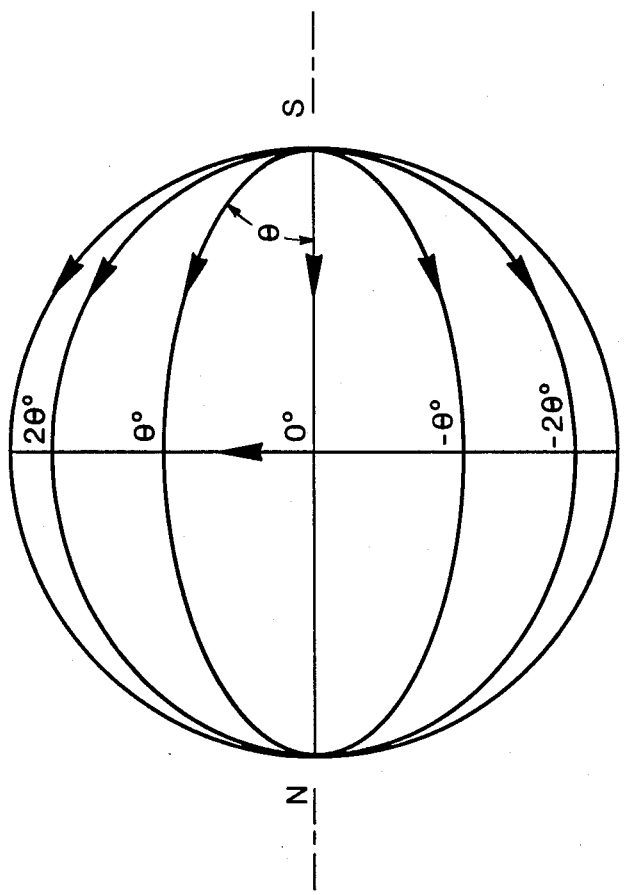
FIG. 5 is a schematic illustration showing the paths along which a sequence of roundness measurements might be taken to determine the sphericity of a manufactured ball with the mounting fixture of the invention.

In order to obtain the measurement of roundness at the equator, the ball is first rotated back to its original position, in which its polar axis lies parallel to the axis of the horizontal chuck assembly 12, and its north pole faces the horizontal chuck 56, essentially as shown in FIG. 5. In this position, 0° longitude lies in a horizontal plane and the equator of the ball lies in a vertical plane. The ball is then rotated 90° about a vertical axis, using the vertical chuck assembly, and then 90° about a horizontal axis, using the horizontal chuck assembly. This brings the equator of the ball into a horizontal plane, and orients the 0° line of longitude on the axis of the horizontal chuck assembly. The slide table of the roundness gage is once again adjusted to center the ball on the axis of the overhead spindle, and the roundness of the ball at its equator is measured to complete the series of roundness measurements. At this point, roundness measurements have been taken along all the great circles indicated schematically in FIG. 6.

The information obtained in the series of roundness measurements may be utilized in several ways. One simple technique is to make transparencies of the longitudinal polar chart recordings. The transparencies are overlayed upon one another with the transparencies being shifted as necessary as indicated by the equatorial roundness measurement. Visual analysis of the overlayed transparencies gives a useful qualitative estimate of the sphericity of the ball.

In more sophisticated techniques, the roundness data are digitized and, knowing the orientation of each roundness measurement with respect to the others, assigned to a common three-dimensional coordinate system. An equation representing an imaginary best fit ball can then be calculated, and a three-dimensional map showing contour deviations of the actual surface of the ball from the best fit ball can be produced.

Although the mounting fixture of the present invention has been described and illustrated with reference to a preferred embodiment, and with further reference to one particular method of using the fixture, it will be understood that the foregoing descriptions of the preferred embodiment and method of using it have been presented for purposes of illustration and are not intended to be exhaustive or to limit the invention to the precise form disclosed. Various modifications, substitutions and alterations that may be apparent to one of ordinary skill in the art may be made without departing from the essential spirit of the invention. Accordingly, it is intended that the scope of the invention be defined by the claims appended hereto.

What is claimed is:

1. A ball mounting fixture for a roundness gage comprising first and second ball chuck assemblies mounted on a base means, each ball chuck assembly including a rotatable stage means and ball chuck means, said ball chuck means being operable to selectively retain a ball to be measured for roundness, each chuck assembly further including positioning means attaching said ball chuck means to said rotatable stage means such that said ball chuck means is adjustably movable radially with respect to the axis of rotation of said stage means, whereby a ball supported by said ball chuck means may be centered on the axis of rotation of the respective stage means by radial adjustment of the position of said ball chuck means, the axes of rotation of said stage means of said first and second chuck assemblies being substantially orthogonal such that a ball to be measured for roundness may be rotated through selected angular increments in any angular orientation by successively supporting and rotating said ball as required with said first and second chuck assemblies.

2. The ball mounting fixture defined in claim 1 wherein said positioning means attaching said ball chuck means to said rotatable stage means of each ball chuck assembly includes means pivotably connecting said ball chuck means to said stage means for pivotal motion of said ball chuck means about a pivot point located substantially on the axis of rotation of said stage means.

3. The ball mounting fixture defined in claim 2 wherein said positioning means of each ball chuck assembly comprises a hemispherical pivot element extending from said ball chuck means, and a socket connected to said rotary stage means and configured to cooperably receive said pivot element, said positioning means attaching said ball chuck means and said rotatable stage means of each chuck assembly further including fastener means operable to connect said chuck means and said stage means with said hemispherical pivot element maintained in a selected angular orientation with respect to the associated socket.

4. The ball mounting fixture defined in claim 1 or 3 wherein said ball chuck means of each chuck assembly comprises a vacuum chuck.

5. The ball mounting fixture defined in claim 4 wherein each of said vacuum chucks includes a polymeric ball seat to prevent surface damage to a ball mounted thereon.

6. The ball mounting fixture defined in claim 5 wherein each of said polymeric ball seats is formed of polystyrene.

7. The ball mounting fixture defined in claim 1 or 3 wherein said rotatable stage means of each chuck assembly comprises a rotatable stage of a precision rotary table.

8. The ball mounting fixture defined in claim 1 or 3 wherein said first chuck assembly extends upwardly from said base means and operating to support a ball while roundness measurements are taken, said second chuck assembly extending substantially horizontally and operating to support and selectively rotate said ball between roundness measurements.

9. The ball mounting fixture defined in claim 8 wherein said second chuck assembly is mounted on an adjustable three-way slide table assembly mounted on said base means, said slide table assembly enabling said second chuck assembly to be moved rectilinearly in three dimensions to thereby enable said second chuck assembly to be selectively moved toward and away from a ball supported by the first chuck assembly, and to also accommodate balls of varying diameter supported by said first chuck assembly.

10. The ball mounting fixture defined in claim 9 wherein said ball chuck means of each chuck assembly comprises a vacuum chuck.

* * * * *